US008400202B2

(12) United States Patent
Minaki

(10) Patent No.: US 8,400,202 B2
(45) Date of Patent: Mar. 19, 2013

(54) CLOCK GENERATOR INTERMITTENTLY GENERATING SYNCHRONOUS CLOCK

(75) Inventor: Takahiro Minaki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 81 days.

(21) Appl. No.: 13/064,596

(22) Filed: Apr. 1, 2011

(65) Prior Publication Data

US 2011/0248762 A1 Oct. 13, 2011

(30) Foreign Application Priority Data

Apr. 7, 2010 (JP) ................................. 2010-088847

(51) Int. Cl.
*G06F 1/04* (2006.01)
*H03K 3/00* (2006.01)
(52) U.S. Cl. .................... 327/291; 327/293; 327/295
(58) Field of Classification Search .................. 327/291, 327/293, 295
See application file for complete search history.

(56) References Cited

U.S. PATENT DOCUMENTS

2005/0285655 A1 * 12/2005 Komura ...................... 327/295

FOREIGN PATENT DOCUMENTS

JP 7-129272 A 5/1995

* cited by examiner

*Primary Examiner* — John Poos
(74) *Attorney, Agent, or Firm* — McGinn IP Law Group, PLLC

(57) ABSTRACT

A clock generator includes a counter receiving a reference clock signal to generate a timing signal based on the reference clock signal, and a plurality of intermittent clock generating units each coupled to a storage unit thereof storing a bit strings data, each of the intermittent clock generating units receiving the reference clock signal and the timing signal. Each of the intermittent clock generating units masks a clock pulse of the reference clock signal based on the bit string data stored in the storage unit thereof to output an intermittent clock signal in response to the timing signal.

2 Claims, 13 Drawing Sheets

CLOCK GENERATOR INTERMITTENTLY GENERATING SYNCHRONOUS CLOCK

CROSS-REFERENCE TO RELATED APPLICATIONS

This application is based upon and claims the benefit of priority from Japanese patent application No. 2010-088847, filed on Apr. 7, 2010, the disclosure of which is incorporated herein in its entirety by reference.

BACKGROUND

This invention relates to a clock generator, particular to a clock generator generating a synchronous clock intermittently.

It is known that, in a logic circuit driven by the synchronous clock, a consumed current increases in proportion to the frequency of the clock. In a system using the logic circuit, it is a key issue to reduce current consumption. As a power saving method for a logic circuit driven by a synchronous clock, there is a technique that generates the synchronous clock to be supplied to the logic circuit intermittently according to a required processing speed.

Further, when a parallel processing is performed by a plurality of logic circuits, a required processing speed generally differs depending on processing. When a clock suitable for each processing speed is supplied to the plurality of logic circuits in an intermittent manner, the timing at the peak power of each logic circuit coincides thereby increasing the entire peak power. Therefore, a means of scattering the timing of each peak power is required.

A clock generator to achieve low power consumption suitable for a required processing speed is disclosed in Japanese Unexamined Patent Application Publication No. 07-129272 (Patent literature 1), for example. The clock generator is described hereinafter with reference to FIGS. 10 and 11. FIG. 10 is a block diagram to illustrate an overall configuration of the clock generator according to related art which is disclosed in Patent literature 1. FIG. 11 is a timing chart to illustrate a clock waveform of the clock generator according to the related art.

In FIG. 10, an oscillator 101 outputs a clock 104 with a constant frequency, like a crystal oscillator, for example. A clock rate control circuit 102 controls the clock 104 to generate an operating clock 105. A logic circuit 103 operates with the operating clock 105. The clock rate control circuit 102 generates the operating clock 105 as an intermittent clock and varies the number of clock pulses per unit time according to processing speed requirements.

The operating clock 105 is processed into a waveform 108 or a waveform 109 shown in FIG. 11, for example, by the clock rate control circuit 102. The waveform 108 is to obtain a processing speed of 100%, which is the same as a waveform 107 of the clock 104. The waveform 109 is to obtain a processing speed of 75%, in which a continuous period and an idle period of the clock are repeated at a ratio of 3:1. In FIG. 11, the waveform 109 involves repetition of the continuous period where the clock continues for the duration of six pulses and the idle period where the clock is suspended for the duration of two pulses.

SUMMARY

However, the present inventors have found a problem that, in Patent literature 1, because the operating clock 105 processed by the clock rate control circuit 102 is an intermittent clock in which the continuous period and the idle period of the clock each occur in a consecutive manner, the peak current increases in some cases. This is described hereinafter with reference to FIG. 12. FIG. 12 is a timing chart showing an example of a change over time of the power of the logic circuit driven using the clock generator according to the related art.

When the logic circuit 103 requires a processing speed of 50%, for example, the operating clock 105 is processed into a waveform 110 shown in FIG. 12 by the clock rate control circuit 102. The waveform 110 is an intermittent clock in which the continuous period and the idle period of the clock are repeated at a ratio of 1:1. In FIG. 12, the waveform 110 involves repetition of the continuous period where the clock continues for the duration of five pulses and the idle period where the clock is suspended for the duration of five pulses. When the intermittent clock with the waveform 110 shown in FIG. 12 is supplied, the timing of switching a transistor inside the logic circuit 103 becomes irregular. As a result, a change over time of the power of the logic circuit 103 becomes like a waveform 111 shown in FIG. 12, and the peak power increases.

Further, the present inventors have found a problem that, in Patent literature 1, because there is no function to appropriately adjust the oscillation timing of the intermittent clock, the peak power increases in some cases when performing parallel processing in a plurality of logic circuits. This is described hereinafter with reference to FIGS. 13 to 15. FIG. 13 is a block diagram to illustrate an overall configuration of a clock generator which is a simple expansion of the clock generator in FIG. 10. FIGS. 14 and 15 are timing charts showing an example of a change over time of the total power of logic circuits driven using the clock generator in FIG. 13.

In the case of performing parallel processing in a plurality of logic circuits by use of the technique of Patent literature 1, the configuration is such that logic circuits 103a, 103b and 103c are respectively connected to clock rate control circuits 102a, 102b and 102c which are connected in parallel to one oscillator 101 as shown in FIG. 13.

When the logic circuit 103a requires a processing speed of 30%, the logic circuit 103b requires a processing speed of 60%, and the logic circuit 103c requires a processing speed of 70%, operating clocks 105a, 105b and 105c are respectively processed into waveforms 112, 113 and 114 shown in FIG. 14 by the clock rate control circuits 102a, 102b and 102c. When the intermittent clocks with the waveforms 112, 113 and 114 shown in FIG. 14 are supplied, a change over time of the total power of the logic circuits 103a, 103b and 103c becomes like a waveform 115 shown in FIG. 14. Specifically, the timing at which the peak power of the respective logic circuits is generated coincides, and power fluctuations increase. Accordingly, the peak power increases.

Further, when the operating clocks 105a, 105b and 105c are out of phase like waveforms 116, 117 and 118 as shown in FIG. 15, a change over time of the total power of the logic circuits 103a, 103b and 103c becomes like a waveform 119, and the pattern of change over time varies.

A first aspect of the present invention is a clock generator including a counter receiving a reference clock signal to generate a timing signal based on the reference clock signal; and a plurality of intermittent clock generating units each coupled to a storage unit thereof storing a bit strings data, each of the intermittent clock generating units receiving the reference clock signal and the timing signal, wherein each of the intermittent clock generating units masks a clock pulse of the reference clock signal based on the bit string data stored in the storage unit thereof to output a intermittent clock signal in response to the timing signal.

It is thereby possible to adjust the intermittent clocks to be supplied to the respective logic circuits so that the oscillation timing is appropriately scattered, and thereby suppress power fluctuations of the logic circuits as a whole.

A second aspect of the present invention is a control system, including: a counter unit receiving a reference clock signal to generate a timing signal based on the reference clock signal; a plurality of intermittent clock generating units each coupled to a storage unit thereof storing a bit string data, each of the intermittent clock generating units receiving the reference clock signal and the timing signal, wherein each of the intermittent clock generating units masks a clock pulse of the reference clock signal based on the bit string data stored in the storage unit thereof to output a intermittent clock signal in response to the timing signal; a plurality of logic circuits receiving the intermittent clock signals generated by the intermittent clock generating units; and a control unit configured to set each of the bit string data to reduce a peak electric current of the logic circuits. Based on a predicted value of an operating current of each of circuits provided with the intermittent clock signals and each of the bit strings stored in the plurality of storage units, the control unit calculates a total current value being a total of current consumption of the circuits at each bit position, and sets each of the bit strings so as to minimize a change over time of the total current value. It is thereby possible to adjust the intermittent clocks to be supplied to the respective logic circuits so that the oscillation timing is appropriately scattered, and thereby suppress power fluctuations of the logic circuits as a whole.

A third aspect of the present invention is a clock generator including A clock generator including: a counter unit that counts an edge of a reference clock signal and generates a timing signal in each predetermined number of clock cycles; a first storage unit that stores a first bit string having a number of bits equal to the predetermined number of clock cycles; a first clock generation unit that generates a first intermittent clock signal being an intermittent pulse train by thinning out a combination of pulses indicated by the first bit string from the reference clock signal, and outputs the generated first intermittent clock signal according to the timing signal; a second storage unit that stores a second bit string having a number of bits equal to the predetermined number of clock cycles; and a second clock generation unit that generates a second intermittent clock signal being an intermittent pulse train by thinning out a combination of pulses indicated by the second bit string from the reference clock signal, and outputs the generated second intermittent clock signal according to the timing signal. It is thereby possible to adjust the intermittent clocks to be supplied to the respective logic circuits so that the oscillation timing is appropriately scattered, and thereby suppress power fluctuations of the logic circuits as a whole.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Preferred embodiments of the present invention will be described hereinbelow. The following description and the attached drawings are appropriately shortened and simplified to clarify the explanation. Further, the redundant explanation is omitted to clarify the explanation. In the figures, the identical reference symbols denote identical structural elements and the redundant explanation thereof is omitted.

First Embodiment

Figure 1:
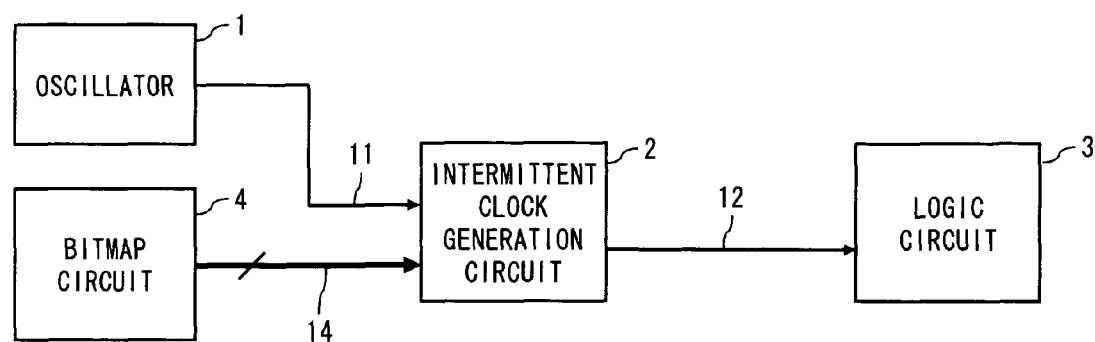
FIG. 1 is a block diagram to illustrate an overall configuration of a clock generator according to a first embodiment.

A configuration of a clock generator according to an embodiment of the present invention is described firstly with reference to FIG. 1. FIG. 1 is a block diagram to illustrate an overall configuration of a clock generator according to a first embodiment.

In FIG. 1, the clock generator according to the embodiment generates an intermittent clock 12, which is an intermittent pulse train after thinning out some pulses from a reference clock 11 that is output from an oscillator 1, and supplies the generated intermittent clock 12 to a logic circuit 3. The clock generator according to the embodiment includes an intermittent clock generation circuit 2 and a bitmap circuit 4 as shown in FIG. 1.

The oscillator 1 outputs a reference clock 11, which is a signal with a constant frequency, like a crystal oscillator, for example.

The bitmap circuit 4 is a storage unit that stores bitmap information 14 indicating intermitting clock oscillation timing. Specifically, the bitmap circuit 4 stores the bitmap information 14 indicating the timing for thinning-out of the intermittent clock that is generated in the intermittent clock generation circuit 2, which is described later. In this embodiment, the bitmap circuit 4 stores the bitmap information 14 indicating the oscillation timing which makes the clock pulses, the number of which corresponds to processing speed requirements of the logic circuit 3, oscillate in an appropriately scattered manner, in each predetermined number of clock cycles of the reference clock 11. The bitmap information 14 is represented by a bit string of a given number of bits which sets enable or disable of clock output for each bit position.

The intermittent clock generation circuit 2 is a clock generator that generates the intermittent clock 12 from the reference clock 11 output from the oscillator 1 and the bitmap information 14 output from the bitmap circuit 4. Stated differently, the intermittent clock generation circuit 2 generates the intermittent clock 12 based on the reference clock 11 and the bitmap information 14.

The logic circuit 3 operates with the generated intermittent clock 12. Stated differently, the logic circuit 3 is driven by the intermittent clock 12.

Figure 2:
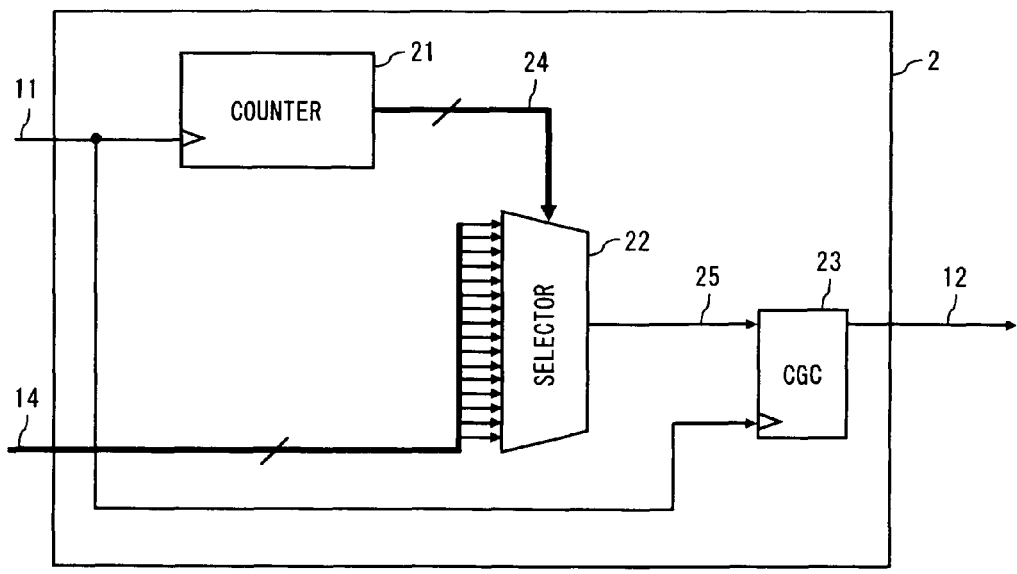
FIG. 2 is a block diagram showing a detailed configuration of an intermittent clock generation circuit according to the first embodiment.

A specific example of the intermittent clock generation circuit 2 is described hereinafter with reference to FIG. 2. FIG. 2 is a block diagram showing a detailed configuration of the intermittent clock generation circuit according to the first embodiment.

The intermittent clock generation circuit 2 includes a counter 21, a selector 22, and a clock gate cell 23. The counter 21 generates a constant timing signal based on the reference clock 11 and outputs a count value 24. The counter 21 functions as a counter unit that counts the edge of the reference clock 11 and generates the timing signal in each predetermined number of clock cycles. The predetermined number of clock cycles for the counter 21 to generate the timing signal is equal to the number of bits of the bitmap information 14. The selector 22 selects the value at the bit position indicated by the count value 24 from the bitmap information 14 and outputs it as a clock enable 25. The clock gate cell 23 outputs the intermittent clock 12 only when the clock enable 25 indicates 1.

When the predetermined number of clock cycles is 16 cycles, which correspond to 16 pulses of the reference clock 11, for example, the counter 21 outputs the count value 24 which is incremented one by one from 0 to 15, for example. Then, the selector 22 selects the value at the bit position indicated by the count value 24 from the 16-bit bitmap information 14 stored in the bitmap circuit 4 and outputs it as the clock enable 25. Note that the range of the count value 24 and the number of bits of the bitmap information 14 may be extended to any range or number according to need. In other words, the range of the count value 24 and the number of bits of the bitmap information 14 may be varied as appropriate.

In this manner, the intermittent clock generation circuit 2 thins out a combination of pulses indicated by the bitmap information 14 from the reference clock 11 and thereby generates the intermittent clock 12, which is an intermittent pulse train. The intermittent clock generation circuit 2 then outputs the generated intermittent clock 12 according to the timing signal.

The operation of the clock generator according to the embodiment is described hereinbelow. First, the bitmap information 14 output from the bitmap circuit 4 is set to the one corresponding to a processing speed required by the logic circuit 3. The intermittent clock generation circuit 2 thins out given clock pulses from the reference clock 11 output from the oscillator 1 based on the bitmap information 14 and thereby generates the intermittent clock 12.

Specifically, when the reference clock 11 is output from the oscillator 1, the counter 21 generates a constant timing signal based on the reference clock 11 and outputs the count value 24. The selector 22 selects the value at the bit position indicated by the count value 24 from the bitmap information 14 and outputs it as the clock enable 25. The clock gate cell 23 outputs the intermittent clock 12 only when the clock enable 25 indicates 1.

In this manner, the intermittent clock 12 with the oscillation timing controlled arbitrarily in units of the predetermined number of clock cycles is generated, and the generated intermittent clock 12 is supplied to the logic circuit 3. The intermittent clock 12 is such that the number of clock pulses per unit time is varied according to processing speed requirements of the logic circuit 3 and the oscillation timing is adjusted to be scattered moderately for each predetermined number of clock cycles. The logic circuit 3 operates with the intermittent clock 12.

Figure 3:
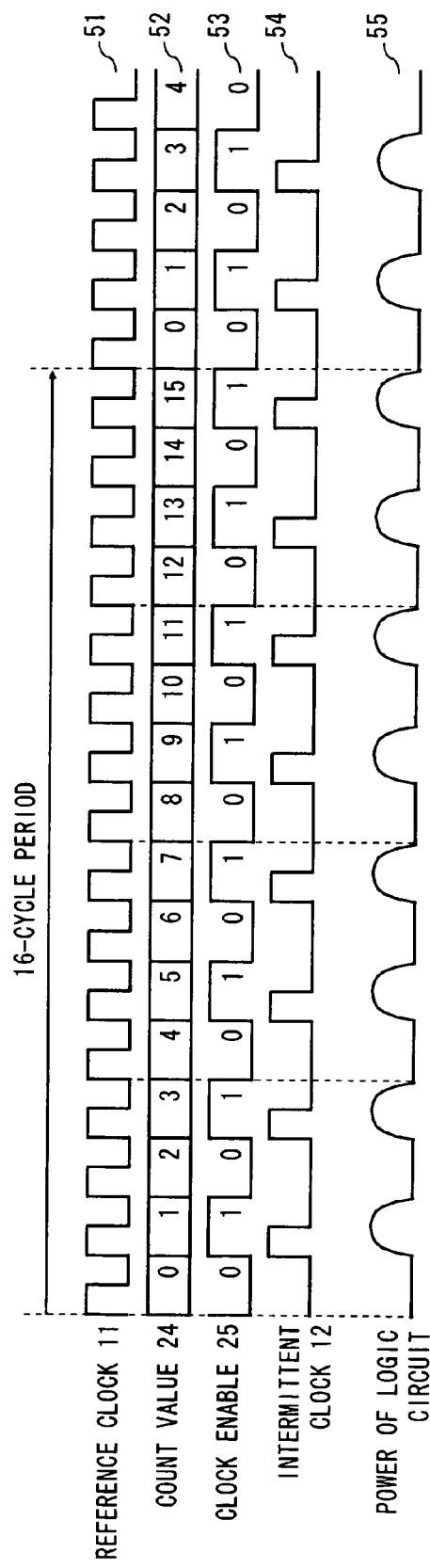
FIG. 3 is a timing chart showing an example of a change over time of the power of a logic circuit driven using the clock generator according to the first embodiment.

Hereinafter, a change over time of the power of the logic circuit 3 driven with the intermittent clock 12 that is generated in the clock generator according to the embodiment is described with reference to FIG. 3. FIG. 3 is a timing chart showing an example of a change over time of the power of the logic circuit driven using the clock generator according to the first embodiment.

The case of generating the intermittent clock 12 in a period of 16 cycles, which correspond to 16 clock cycles of the reference clock 11 having a waveform 51 shown in FIG. 3, is described hereinafter by way of illustration. When the logic circuit 3 requires a processing speed of 50%, for example, 0xAAAA (in hexadecimal notation) is set as the bitmap information 14, for example.

The count value 24 generated by the counter 21 is incremented one by one from 0 to 15 in a repetitive manner based on the reference clock 11 as shown in a timing signal 52 in FIG. 3. As the clock enable 25, the value of the bitmap information 14 at the bit position indicated by the count value 24 is selected as shown in a waveform 53 in FIG. 3. In this example, out of the bitmap information 14 of 16 bits which has been converted from hexadecimal notation to binary notation, the value at the bit position indicated by the count value 24, which is either 0 or 1, is output as the clock enable 25. The intermittent clock 12 oscillates only when the value of the clock enable 25 is 1.

In this manner, the intermittent clock 12 is processed into a waveform 54 shown in FIG. 3 by the intermittent clock generation circuit 2. The waveform 54 is the intermittent clock 12 in which the continuous period and the idle period of the clock are repeated at a ratio of 1:1. In FIG. 3, for example, the waveform 54 involves repetition of the idle period where the reference clock 11 corresponding to one pulse is suspended and the continuous period where the reference clock 11 continues for one pulse.

Figure 12:
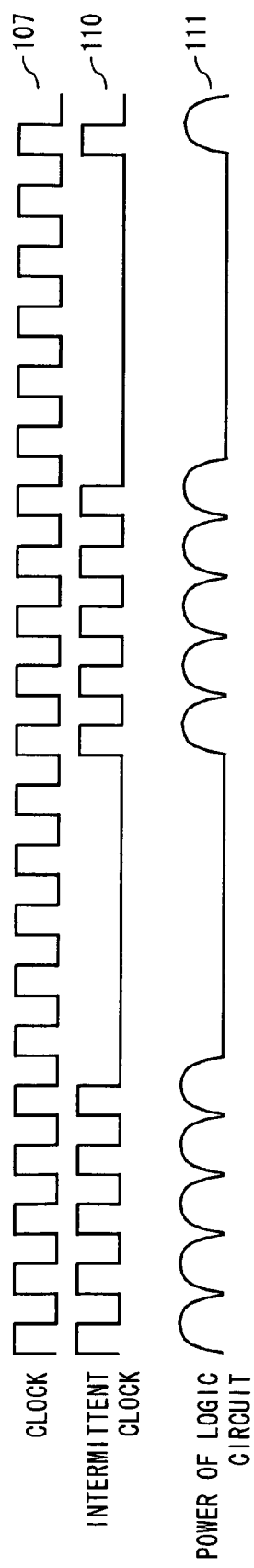
FIG. 12 is a timing chart showing an example of a change over time of the power of a logic circuit driven using the clock generator according to the related art.
Figure 13:
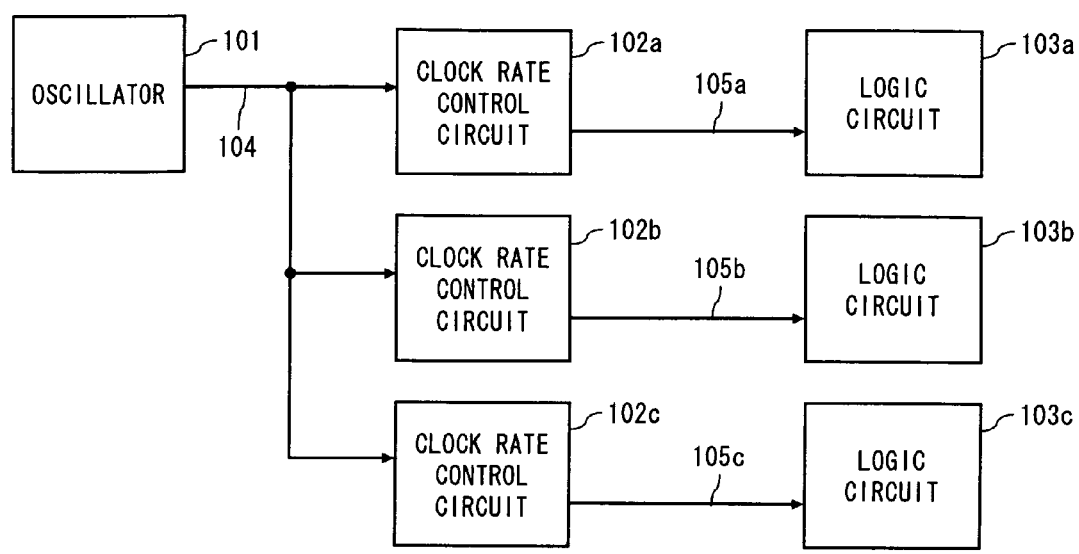
FIG. 13 is a block diagram to illustrate an overall configuration of a clock generator which is a simple expansion of the clock generator in FIG. 10.

When the intermittent clock 12 as shown in the waveform 54 is supplied, upon oscillation of the intermittent clock 12, a switching current of a transistor flows inside the logic circuit 3 and a power is generated. As a result, a change over time of a power consumed in the logic circuit 3 is as shown in a waveform 55 in FIG. 3. In the waveform 55, the timing at which the peak power is generated is scattered compared with a change over time of a power according to the related art shown in the waveform 111 in FIG. 12. Therefore, the peak power can be suppressed.

As described above, in this embodiment, the bitmap circuit 4 that stores the bitmap information 14 indicating the intermittent timing of the intermittent clock is included, and the intermittent clock 12 is generated by thinning out some pulses from the reference clock 11 based on the bitmap information 14. It is thus possible to supply the intermittent clock 12 which makes the clock pulses, the number of which corresponds to a processing speed required by the logic circuit 3, oscillate in a scattered manner, thereby suppressing the peak power of the logic circuit 3. In this manner, setting the oscillation timing of the intermittent clock 12 enables flexible clock control, which can suppress power fluctuations of the logic circuit 3.

Although not shown in FIG. 1, the clock generator may further include a control unit that sets the bitmap information 14. The control unit may appropriately set the bitmap information 14 to be output from the bitmap circuit 4 so as to meet a processing speed required by the logic circuit 3. It is thereby possible to supply the intermittent clock 12 which enables suppression of the peak power to various kinds of the logic circuit 3 that require different processing speeds.

Second Embodiment

Figure 4:
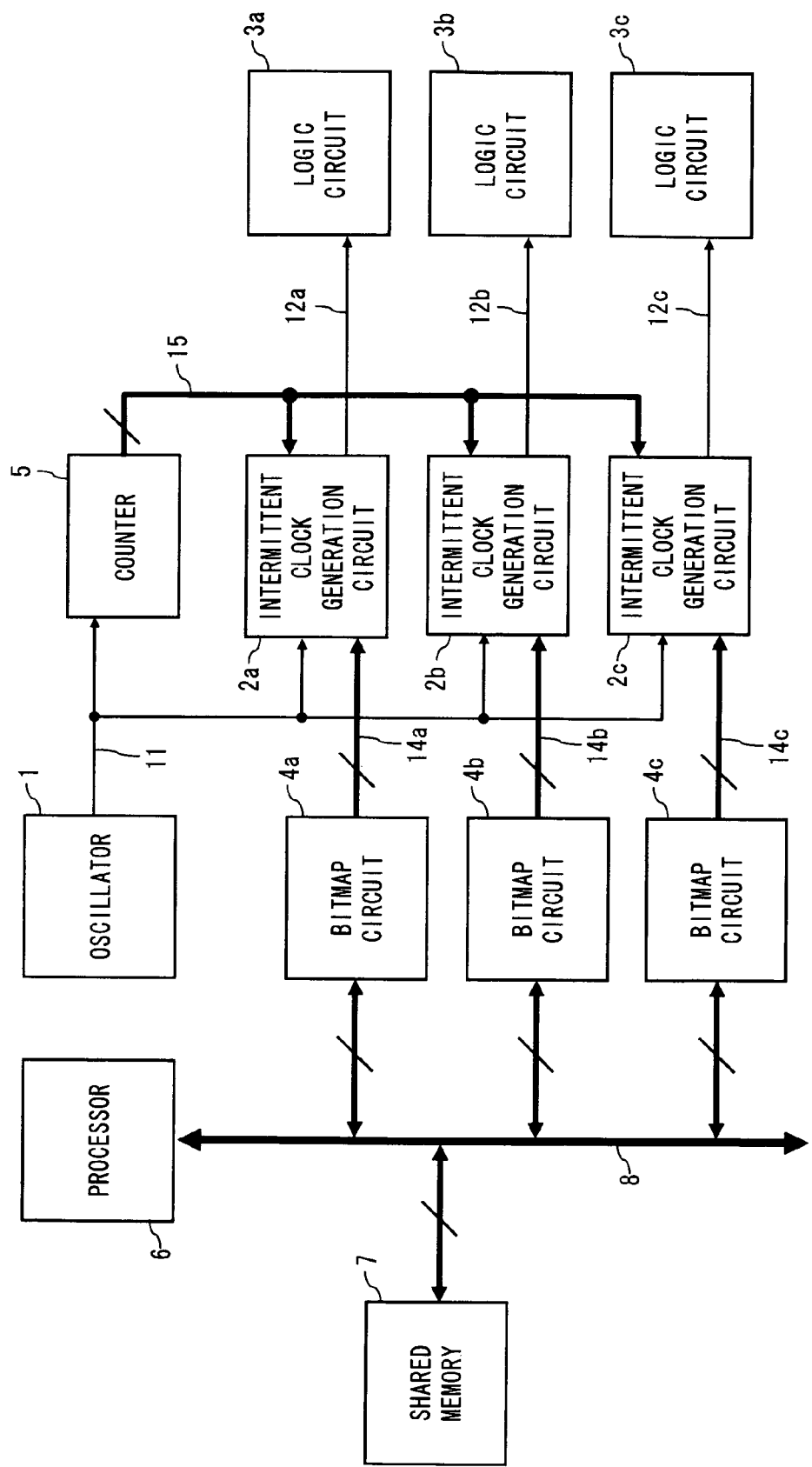
FIG. 4 is a block diagram to illustrate an overall configuration of a clock generator according to a second embodiment.

A configuration of a clock generator according to an embodiment of the present invention is described with reference to FIG. 4. FIG. 4 is a block diagram to illustrate an overall configuration of a clock generator according to a second embodiment. In the first embodiment, the clock generator that supplies the intermittent clock 12 to one logic circuit 3 is described; whereas in this embodiment, the case where the present invention is applied to a clock generator that supplies the intermittent clock 12 to each of a plurality of logic circuits 3 is described.

In FIG. 4, the identical structural elements to those in FIG. 1 are denoted by the identical reference symbols, and differences are described. The clock generator according to the embodiment generates a plurality of intermittent clocks 12, which are intermittent pulse trains after thinning out some pulses from the reference clock 11 that is output from the oscillator 1, and supplies the plurality of generated intermittent clocks 12 to the plurality of logic circuits 3. Hereinafter, the case of supplying three intermittent clocks 12a, 12b and 12c to three logic circuits 3a, 3b and 3c, respectively, is described by way of illustration.

The clock generator according to the embodiment includes three intermittent clock generation circuits 2a, 2b and 2c (which are referred to simply as the intermittent clock generation circuit 2 when not distinguishing among the respective intermittent clock generation circuits), and three bitmap circuits 4a, 4b and 4c (which are referred to simply as the bitmap circuit 4 when not distinguishing among the respective bitmap circuits), and a counter 5.

The bitmap circuits 4a, 4b and 4c respectively store bitmap information 14a, 14b and 14c (which are referred to simply as the bitmap information 14 when not distinguishing among the respective bitmap information) indicating intermitting clock oscillation timing. The bitmap circuits 4a, 4b and 4c store the bitmap information 14 indicating the oscillation timing which makes the clock pulses, the number of which corresponds to processing speed requirements of the respective logic circuits 3a, 3b and 3c, oscillate in an appropriately scattered manner, in each predetermined number of clock cycles of the reference clock 11 output from the oscillator 1. The bitmap information 14 is represented by a bit string of a given number of bits which sets enable or disable of clock output for each bit position. The bitmap circuits 4a, 4b and 4c may be rewritable resistors, for example. The bitmap circuits 4a, 4b and 4c supply the bitmap information 14a, 14b and 14c to the intermittent clock generation circuits 2a, 2b and 2c, respectively.

Further, in this embodiment, the counter 5 is provided for shared use by the intermittent clock generation circuits 2a, 2b and 2c. The counter 5 generates a constant timing signal based on the reference clock 11 that is output from the oscillator 1 and outputs a count value 15. The counter 5 functions as a counter unit that counts the edge of the reference clock 11 and generates the timing signal in each predetermined number of clock cycles. The predetermined number of clock cycles for the counter 5 to generate the timing signal is equal to the number of bits of the bitmap information 14. The counter 5 supplies the count value 15 to each of the intermittent clock generation circuits 2a, 2b and 2c.

The intermittent clock generation circuits 2a, 2b and 2c are clock generators that generate the intermittent clocks 12a, 12b and 12c, respectively, based on the reference clock 11 and the bitmap information 14a, 14b and 14c. Specifically, the intermittent clock generation circuit 2a generates the intermittent clock 12a based on the reference clock 11 output from the oscillator 1 and the bitmap information 14a output from the bitmap circuit 4a. Likewise, the intermittent clock generation circuit 2b generates the intermittent clock 12b based on the reference clock 11 output from the oscillator 1 and the bitmap information 14b output from the bitmap circuit 4b. Further, intermittent clock generation circuit 2c generates the intermittent clock 12c based on the reference clock 11 output from the oscillator 1 and the bitmap information 14c output from the bitmap circuit 4c.

The logic circuits 3a, 3b and 3c operate with the generated intermittent clocks 12a, 12b and 12c, respectively. Specifically, the logic circuit 3a is driven by the intermittent clock 12a. Further, the logic circuit 3b is driven by the intermittent clock 12b, and the logic circuit 3c is driven by the intermittent clock 12c.

Figure 5:
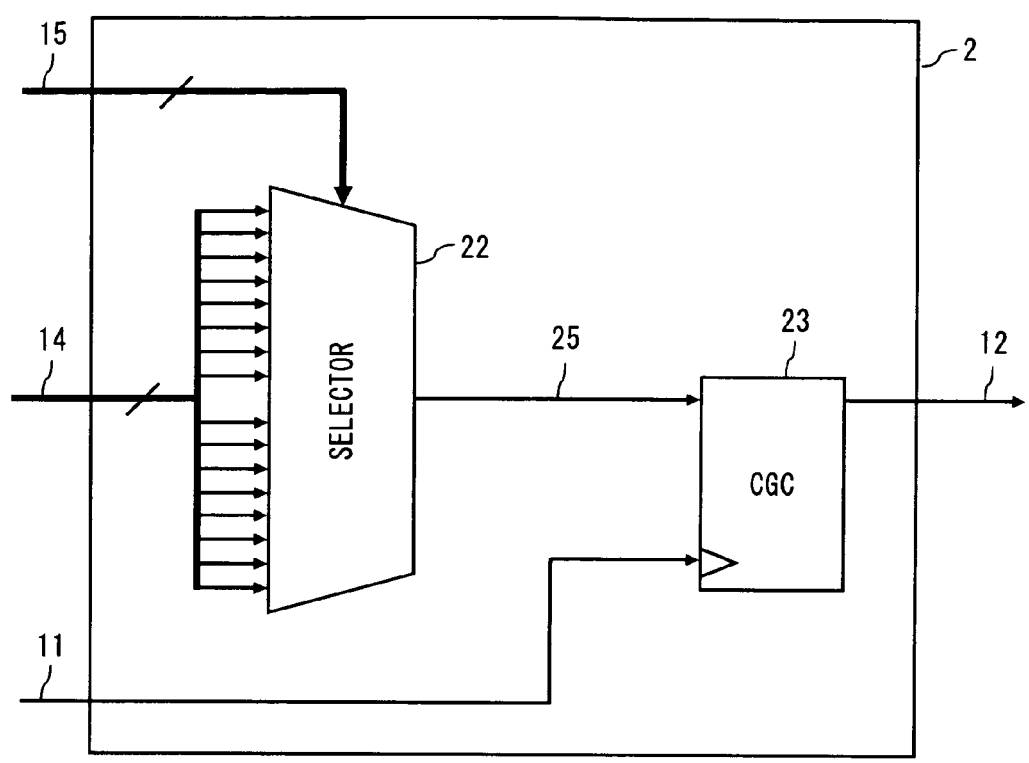
FIG. 5 is a block diagram showing a detailed configuration of an intermittent clock generation circuit according to the second embodiment.

A specific example of the intermittent clock generation circuit 2 (2a, 2b, 2c) is described hereinafter with reference to FIG. 5. FIG. 5 is a block diagram showing a detailed configuration of the intermittent clock generation circuit according to the second embodiment.

The intermittent clock generation circuit 2 includes a selector 22 and a clock gate cell 23 as shown in FIG. 5. The selector 22 selects the value at the bit position indicated by the count value 15 from the bitmap information 14 and outputs it as a clock enable 25. The clock gate cell 23 outputs the intermittent clock 12 only when the clock enable 25 indicates 1.

Thus, in the intermittent clock generation circuit 2a, the value of the bitmap information 14a at the bit position indicated by the count value 15 is output as a clock enable 25a from the selector 22, and the intermittent clock 12a is output from the clock gate cell 23 only when the clock enable 25a indicates 1. Likewise, in the intermittent clock generation circuit 2b, the value of the bitmap information 14b at the bit position indicated by the count value 15 is output as a clock enable 25b from the selector 22, and the intermittent clock 12b is output from the clock gate cell 23 only when the clock enable 25b indicates 1. Further, in the intermittent clock generation circuit 2c, the value of the bitmap information 14c at the bit position indicated by the count value 15 is output as a clock enable 25c from the selector 22, and the intermittent clock 12c is output from the clock gate cell 23 only when the clock enable 25c indicates 1.

In this manner, the intermittent clock generation circuits 2a, 2b and 2c thin out a combination of pulses indicated by the bitmap information 14a, 14b and 14c from the reference clock 11 and thereby generate the intermittent clocks 12a, 12b and 12c, which are intermittent pulse train. The intermittent clock generation circuits 2a, 2b and 2c then output the generated intermittent clocks 12a, 12b and 12c according to the timing signal.

The clock generator according to the embodiment further includes a processor 6 and a shared memory 7 as shown in FIG. 4. The processor 6 serves as control unit that sets the bitmap information 14a, 14b and 14c to the bitmap circuits 4a, 4b and 4c, respectively. The shared memory 7 is a storage unit that stores an optimum combination of the bitmap information for each operating mode, for example. In this embodiment, the shared memory 7 stores a combination of the bitmap information 14a, 14b and 14c which is predetermined so that a difference of the total of the bitmap information 14a, 14b and 14c stored in the bitmap circuits 4a, 4b and 4c with respect to each bit position reduced among all bit positions, for example. The processor 6, the shared memory 7, and the bitmap circuits 4a, 4b and 4c are connected through a system bus 8.

The processor 6 reads the optimum combination of the bitmap information from the shared memory 7 according to operating mode and sets the bitmap information 14a, 14b and 14c to the bitmap circuits 4a, 4b and 4c through the system bus 8. In this embodiment, the processor 6 has a feature that it sets each of the bitmap information 14a, 14b and 14c so that a difference of the total of the bitmap information 14a, 14b and 14c stored in the bitmap circuits 4a, 4b and 4c with respect to each bit position is reduced among all bit positions. In other words, the processor 6 sets each of the bitmap information 14a, 14b and 14c based on the combination stored in the shared memory 7. Thus, the combination of the bitmap information 14a, 14b and 14c is set which makes the clock pulses, the number of which depends on the respective processing speed requirements of the logic circuits 3a, 3b and 3c, oscillate at the timing so that a peak of the total current value consumed in the logic circuits 3a, 3b and 3c is reduced.

The operation of the clock generator according to the embodiment is described hereinbelow. First, the processor 6 sets the combination of the bitmap information 14a, 14b and 14c which respectively correspond to processing speeds required by the logic circuits 3a, 3b and 3c and which satisfy that the total of the bitmap information 14a, 14b and 14c with respect to each bit position is equalized among all bit positions. When the reference clock 11 is output from the oscillator 1, the counter 5 generates a constant timing signal based on the reference clock 11 and outputs the count value 15.

The intermittent clock generation circuits 2a, 2b and 2c respectively thin out given clock pulses from the reference clock 11 that is output from the oscillator 1 based on the bitmap information 14a, 14b and 14c and thereby generate the intermittent clocks 12a, 12b and 12c. Specifically, the selector 22 selects the values at the bit position indicated by the count value 15 from the bitmap information 14a, 14b and 14c and output them as clock enables 25a, 25b and 25c. The clock gate cell 23 outputs the intermittent clocks 12a, 12b and 12c only when the clock enables 25a, 25b and 25c indicate 1.

In this manner, the intermittent clocks 12a, 12b and 12c with the oscillation timing controlled arbitrarily in units of the predetermined number of clock cycles is generated, and the generated intermittent clocks 12a, 12b and 12c are respectively supplied to the logic circuits 3a, 3b and 3c. The intermittent clocks 12a, 12b and 12c are such that the number of clock pulses per unit time is varied according to processing speed requirements of the logic circuits 3a, 3b and 3c and the oscillation timing is adjusted so that they oscillate at the timing by which a time with change of the total current value consumed in the logic circuits 3a, 3b and 3c as a whole is minimized. The logic circuits 3a, 3b and 3c operate with the intermittent clocks 12a, 12b and 12c.

Figure 6:
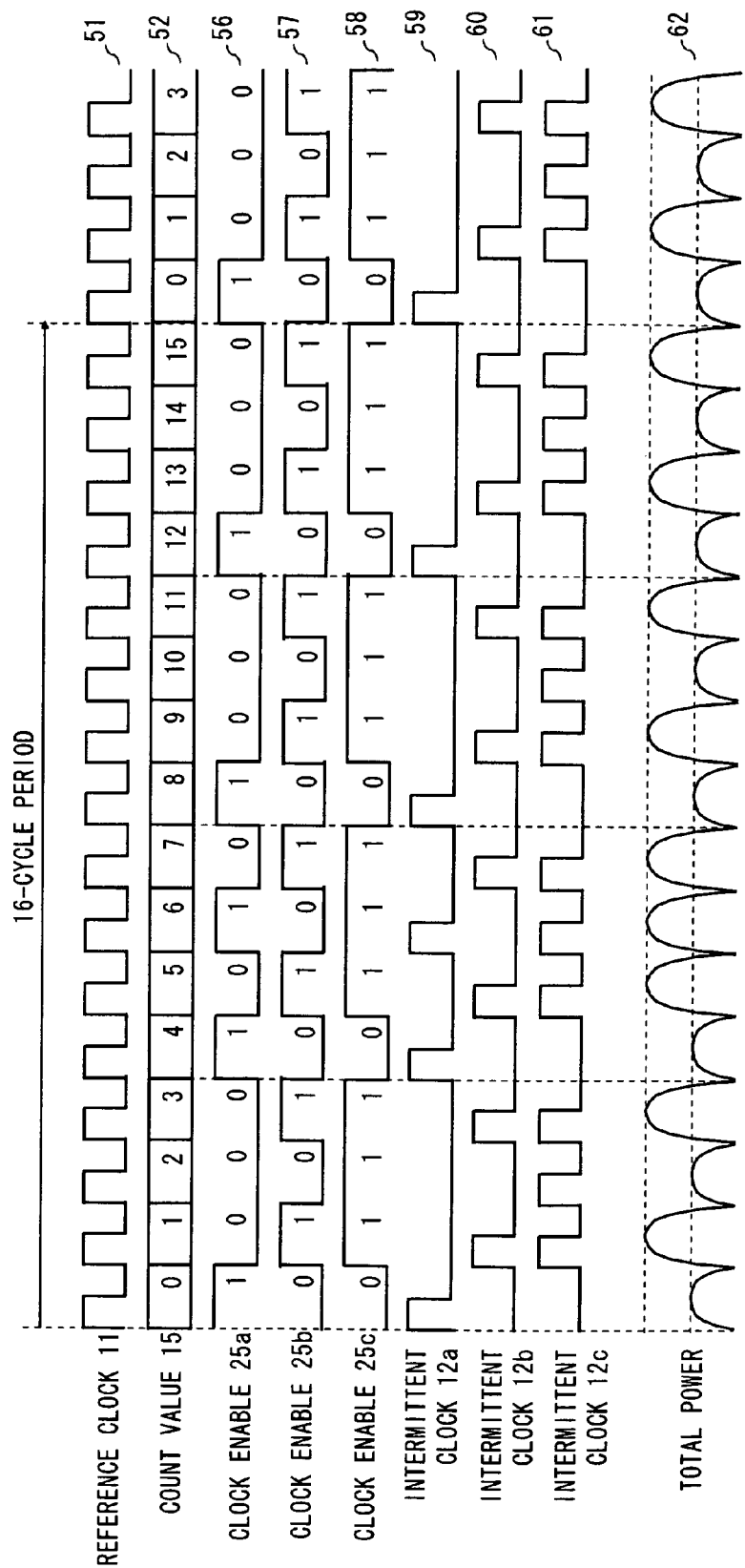
FIG. 6 is a timing chart showing an example of a change over time of the total power of logic circuits as a whole driven using the clock generator according to the second embodiment.

Hereinafter, a change over time of the total power of the logic circuits 3a, 3b and 3c driven with the intermittent clocks 12a, 12b and 12c generated in the clock generator according to the embodiment is described with reference to FIG. 6. FIG. 6 is a timing chart showing an example of a change over time of the total power of logic circuits as a whole which are driven using the clock generator according to the second embodiment. The case of generating three intermittent clocks 12a, 12b and 12c in a period of 16 cycles, which correspond to 16 clock cycles of the reference clock 11 having a waveform 51 shown in FIG. 6, is described hereinafter by way of illustration.

As the combination of the bitmap information 14 in the case of supplying the intermittent clocks to the three logic circuits 3 that respectively require processing speeds of 30%, 50% and 70%, for example, 0x1151, 0xAAAA and 0xEEEE (in hexadecimal notation) are respectively defined in the shared memory 7. When the logic circuits 3a, 3b and 3c require processing speeds of 30%, 50% and 70%, respectively, the processor 6 reads 0x1151, 0xAAAA and 0xEEEE as the bitmap information 14a, 14b and 14c, respectively, from the shared memory 7. Then, the processor 6 sets the read bitmap information 14a, 14b and 14c, i.e., 0x1151, 0xAAAA and 0xEEEE, to the bitmap circuits 4a, 4b and 4c, respectively.

The count value 15 generated by the counter 5 is incremented one by one from 0 to 15 in a repetitive manner based on the reference clock 11 as shown in a timing signal 52 in FIG. 6. As the clock enable 25a, the value of the bitmap information 14a at the bit position indicated by the count value 15 is selected by the selector 22 as shown in a waveform 56 in FIG. 6. In this example, out of the bitmap information 14a of 16 bits which has been converted from hexadecimal notation to binary notation, the value at the bit position indicated by the count value 15, which is either 0 or 1, is output as the clock enable 25a. The intermittent clock 12a oscillates only when the value of the clock enable 25a is 1.

Likewise, as the clock enable 25b, the value of the bitmap information 14b at the bit position indicated by the count value 15 is selected by the selector 22 as shown in a waveform 57 in FIG. 6. In this example, out of the bitmap information 14b of 16 bits which has been converted from hexadecimal notation to binary notation, the value at the bit position indicated by the count value 15, which is either 0 or 1, is output as the clock enable 25b. The intermittent clock 12b oscillates only when the value of the clock enable 25b is 1.

Further, as the clock enable 25c, the value of the bitmap information 14c at the bit position indicated by the count value 15 is selected by the selector 22 as shown in a waveform 58 in FIG. 6. In this example, out of the bitmap information 14c of 16 bits which has been converted from hexadecimal notation to binary notation, the value at the bit position indicated by the count value 15, which is either 0 or 1, is output as the clock enable 25c. The intermittent clock 12c oscillates only when the value of the clock enable 25c is 1.

In this manner, the intermittent clock 12a is processed into a waveform 59 shown in FIG. 6 by the intermittent clock generation circuit 2a. The waveform 59 is the intermittent clock 12a in which, in the period of 16 cycles, the reference clock 11 corresponding to 11 pulses is thinned out, and the reference clock 11 corresponding to 5 pulses is maintained. In the waveform 59 of FIG. 6, for example, the reference clock 11 is suspended when the count value 15 is 1, 2, 3, 5, 7, 9, 10, 11, 13, 14 and 15.

On the other hand, the intermittent clock 12b is processed into a waveform 60 shown in FIG. 6 by the intermittent clock generation circuit 2b. The waveform 60 is the intermittent clock 12b in which, in the period of 16 cycles, the reference clock 11 corresponding to 8 pulses is thinned out, and the reference clock 11 corresponding to 8 pulses is maintained. In the waveform 60 of FIG. 6, for example, the reference clock 11 is suspended when the count value 15 is 0, 2, 4, 6, 8, 10, 12 and 14.

Further, the intermittent clock 12c is processed into a waveform 61 shown in FIG. 6 by the intermittent clock generation circuit 2c. The waveform 61 is the intermittent clock 12c in which, in the period of 16 cycles, the reference clock 11 corresponding to 4 pulses is thinned out, and the reference clock 11 corresponding to 12 pulses is maintained. In the waveform 61 of FIG. 6, for example, the reference clock 11 is suspended when the count value 15 is 0, 4, 8 and 12.

Figure 14:
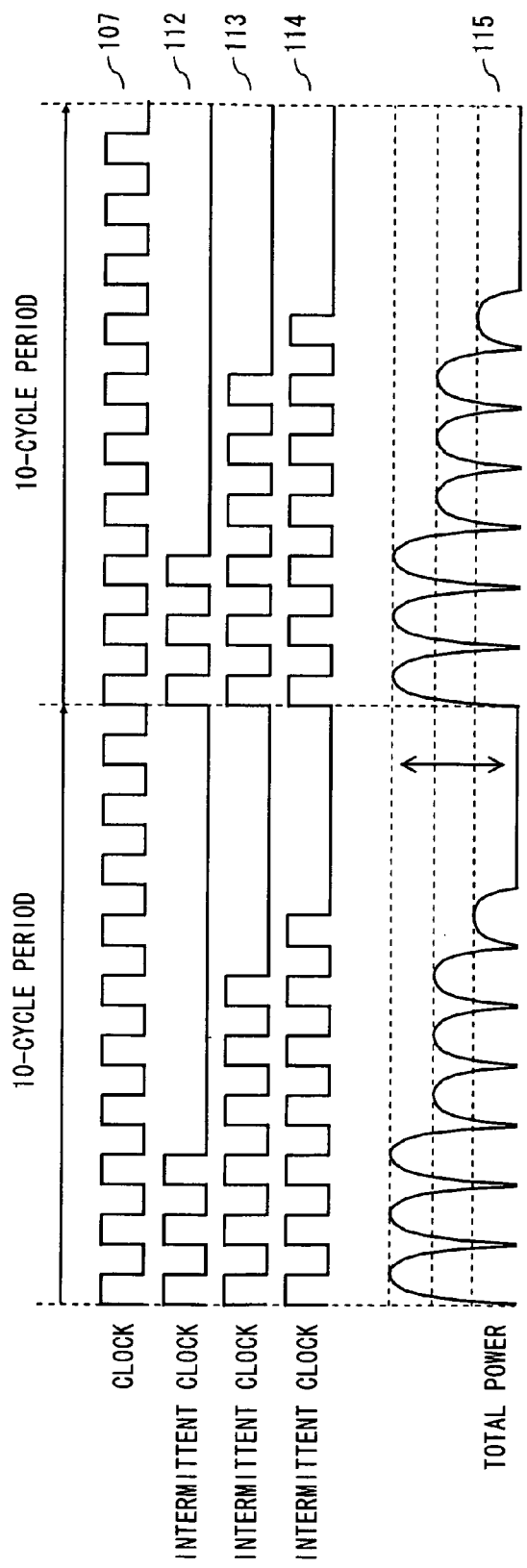
FIG. 14 is timing chart showing an example of a change over time of the total power of logic circuits driven using the clock generator in FIG. 13.
Figure 15:
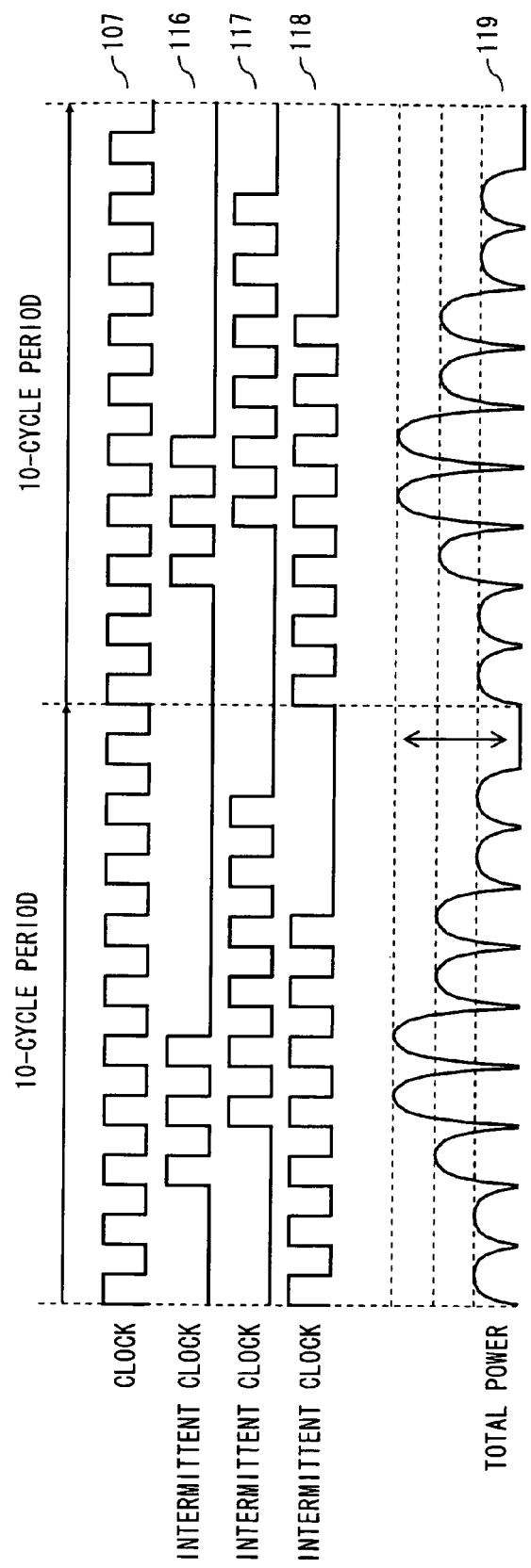
FIG. 15 is timing chart showing an example of a change over time of the total power of logic circuits driven using the clock generator in FIG. 13.

When the intermittent clocks 12a, 12b and 12c as shown in the waveforms 59, 60 and 61 are respectively supplied to the logic circuits 3a, 3b and 3c, upon oscillation of the intermittent clocks 12a, 12b and 12c, a switching current of transistors flows inside the logic circuits 3a, 3b and 3c and a power is generated. As a result, a change over time of the total power consumed in the logic circuits 3a, 3b and 3c as a whole is as shown in a waveform 62 in FIG. 6. In the waveform 62, the timing at which the peak power is generated is scattered, and the power per unit clock is reduced compared with a change over time of the total power according to the related art shown in the waveform 115 in FIG. 14. Thus, the peak power can be suppressed.

Note that, although the clock generator that supplies the intermittent clocks 12a, 12b and 12c to the three logic circuits 3a, 3b and 3c is described by way of illustration in this embodiment, the number of logic circuits to which the clock generator supplies the intermittent clock 12 is not limited to three, and it may be altered as appropriate as long as it is two or more. Accordingly, the number of intermittent clock generation circuits 2 and the number of bitmap circuits 4 included in the clock generator may be also altered as appropriate according to the number of logic circuits 3. Thus, the clock generator according to the embodiment may include at least two intermittent clock generation circuits 2 and at least two bitmap circuits 4. Then, the processor 6 sets the bitmap information 14 to one of the bitmap circuits 4, and sets the bitmap information 14 to the other bitmap circuit 4 based on the set bitmap information 14.

As described above, in this embodiment, a plurality of bitmap circuits 4 and a plurality of intermittent clock generation circuits 2 respectively corresponding to the plurality of bitmap circuits 4 are included in this embodiment. Then, the intermittent clocks 12 generated from the respective intermittent clock generation circuits 2 are respectively supplied to a plurality of logic circuits 3. It is thus possible to supply the intermittent clocks 12 that make the clock pulses, the number of which corresponds to processing speeds respectively required by the plurality of logic circuits 3, oscillate in a scattered manner, thereby suppressing the peak power of the logic circuit 3.

Further, because the counter 5 is provided for shared use by the plurality of intermittent clock generation circuits 2, the phase relations of the respective intermittent clocks 12 generated from the plurality of intermittent clock generation circuits 2 can be controlled. This prevents the plurality of intermittent clocks 12 from being out of phase. It is thereby possible to ensure the consistent pattern of change over time of the total power.

Furthermore, the processor 6 that sets the bitmap information 14 to each of the plurality of bitmap circuits 4 is included in this embodiment. Then, the processor 6 sets the combination of the bitmap information which satisfies that the total of those bitmap information with respect to each bit position is equalized among all bit positions. The peak power of the logic circuits 3 as a whole can be thereby suppressed. In this manner, setting the oscillation timing of the respective intermittent clocks 12 enables flexible clock control, which can suppress power fluctuations of the logic circuits 3 as a whole.

Third Embodiment

A clock generator according to a third embodiment of the present invention supplies intermittent clocks to a plurality of logic circuits 3 in consideration of scale weights of each logic circuit 3. Although the second embodiment is described on the assumption that weights of power per oscillation of the intermittent clock 12 are the same among the logic circuits 3a, 3b and 3c, weights of power per oscillation of the intermittent clocks 12a, 12b and 12c are actually different. In other words, the scales of the logic circuits 3a, 3b and 3c are different depending on processing required, and a current value consumed per oscillation of the intermittent clocks 12a, 12b and 12c differs among the logic circuits 3a, 3b and 3c.

Figure 7:
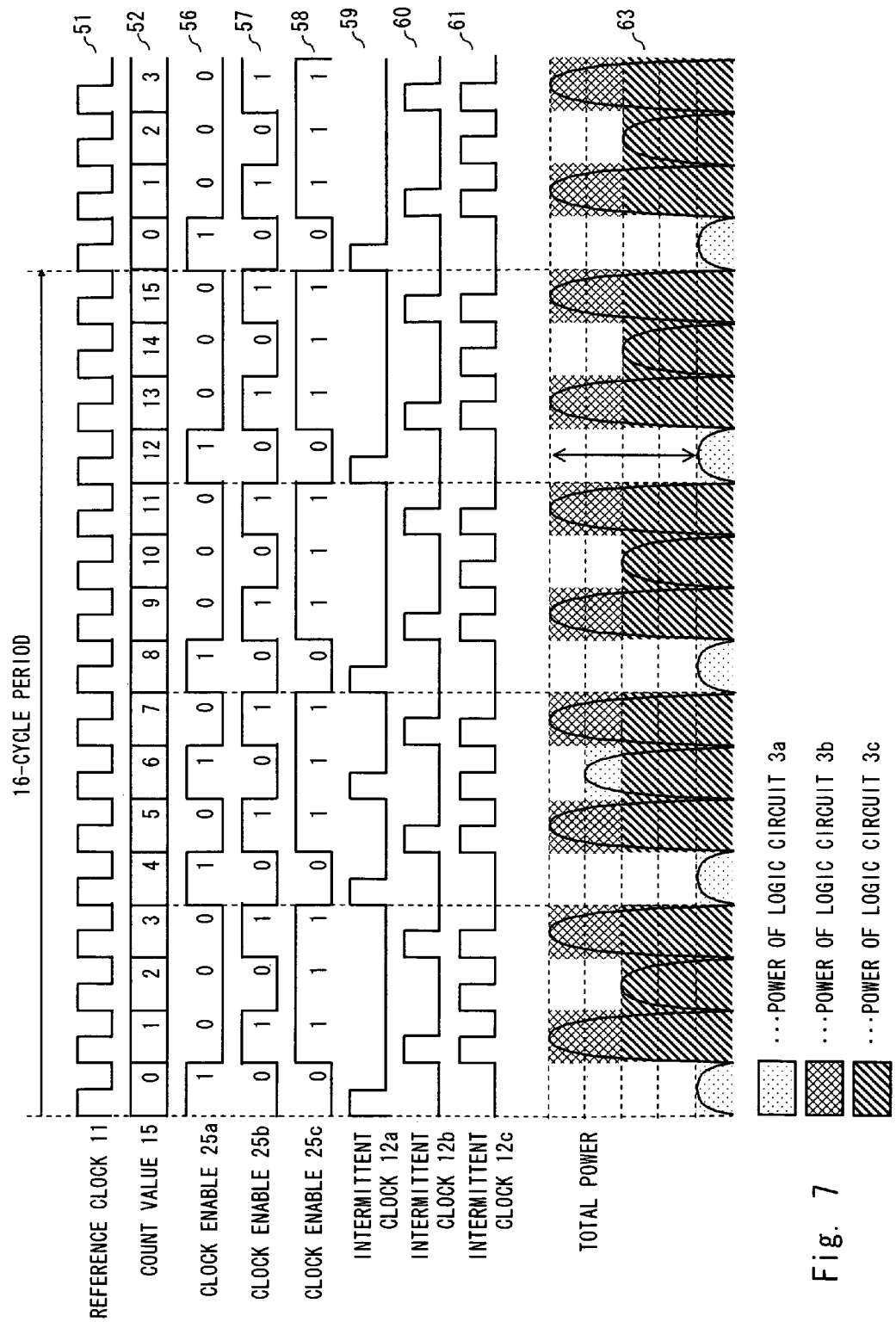
FIG. 7 is a timing chart showing an example of a change over time of the total power of logic circuits as a whole when the logic circuits with different weights of power are driven using the clock generator according to the second embodiment.

When the weighting of powers of the logic circuits 3a, 3b and 3c is changed to 1:2:3 from 1:1:1 shown in FIG. 6, a change over time of the total power of the logic circuits 3a, 3b and 3c as a whole is like a waveform 63 shown in FIG. 7. FIG. 7 is a timing chart showing an example of a change over time of the total power of the logic circuits as a whole when the logic circuits with different weights are driven using the clock generator according to the second embodiment. In the waveform 63, the total power when the intermittent clocks 12b and 12c both oscillate is five times that when only the intermittent clock 12a oscillates, and power fluctuations of the entire logic circuits 3 increase.

As described above, when weights of power per oscillation of the intermittent clocks 12a, 12b and 12c are different, power fluctuations of the logic circuits 3 as a whole increase in some cases. In light of this, a clock generator that can supply intermittent clocks which enable suppression of power fluctuations to a plurality of logic circuits 3 with different weights is described in this embodiment.

A configuration of the clock generator according to this embodiment is substantially the same as that of the clock generator according to the second embodiment shown in FIG. 4. In this embodiment, however, the processor 6 has a feature that it stores a current consumption value indicating a current consumed in each logic circuit 3, and, based on the stored current consumption value, sets the combination of the bitmap information 14 by which a time with change of the total current value consumed in the logic circuits as a whole is minimized to each bitmap circuit 4. Specifically, the processor 6 calculates the total current value which is the total of current consumption of the respective logic circuits 3 at each bit position based on a predicted value of an operating current of each of the logic circuits 3 to which the intermittent clock 12 is supplied and each of the bitmap information 14 stored in the plurality of bitmap circuits 4. Then, the processor 6 sets each of the bitmap information 14 in such a way that a time with change of the calculated total current value is minimized. Further, in this embodiment, the shared memory 7, for example, stores the combination of the bitmap information 14 which is predetermined to minimize a time with change of the total current value. The other configuration is the same as that in the second embodiment and not redundantly described.

Therefore, in the operation of the clock generator according to the embodiment, the processor 6 first sets the bitmap information 14a, 14b and 14c as follows. The processor 6 sets the combination of the bitmap information 14a, 14b and 14c which respectively correspond to processing speeds required by the logic circuits 3a, 3b and 3c and which makes oscillation at the timing by which a time with change of the total current value consumed in the logic circuits 3a, 3b and 3c as a whole is minimized in consideration of the current consumption value of the respective logic circuits 3a, 3b and 3c. The subsequent operation is the same as that in the second embodiment and not redundantly described.

Figure 8:
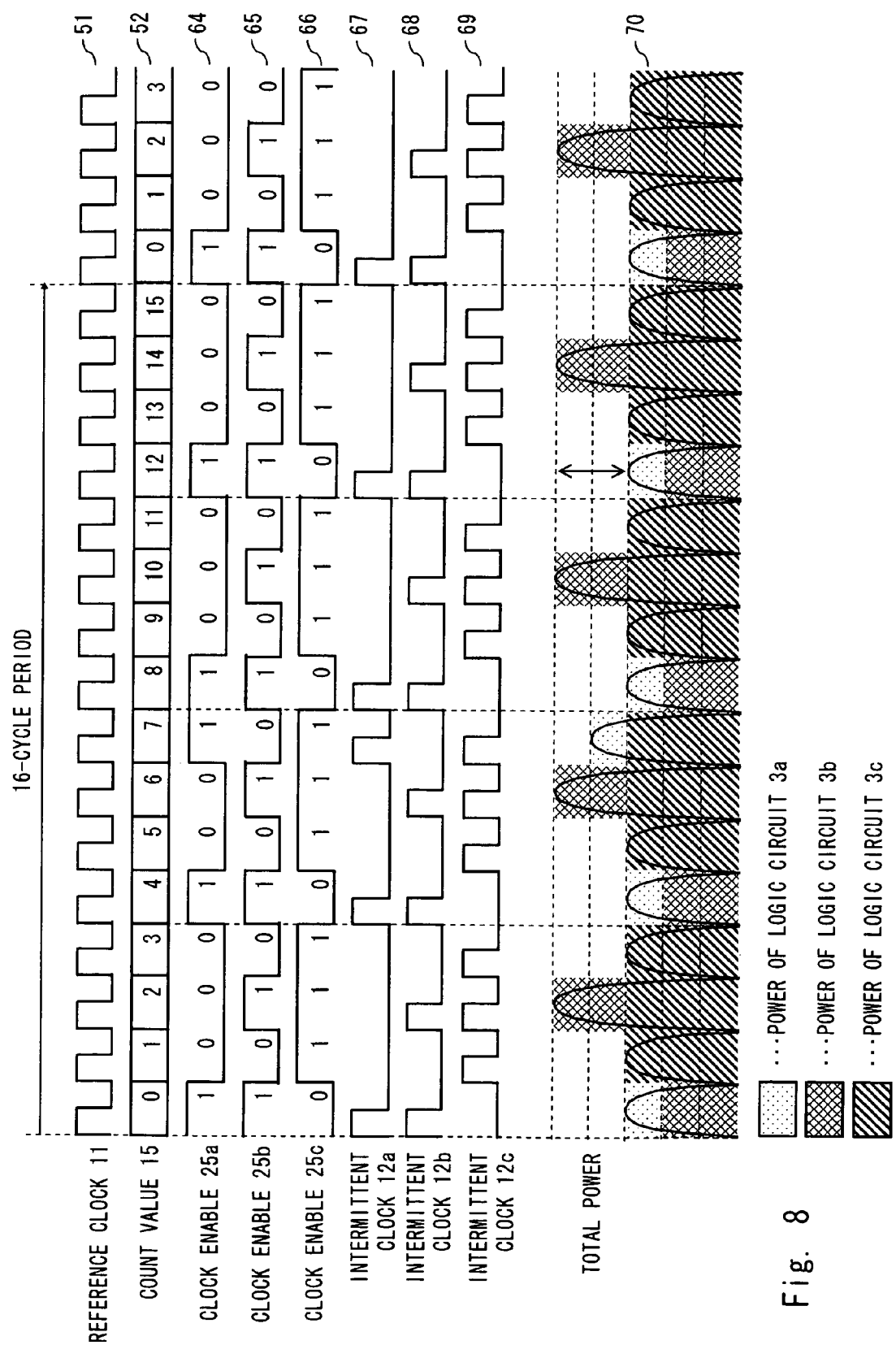
FIG. 8 is a timing chart showing an example of a change over time of the total power of logic circuits as a whole driven using a clock generator according to a third embodiment.
Figure 9:
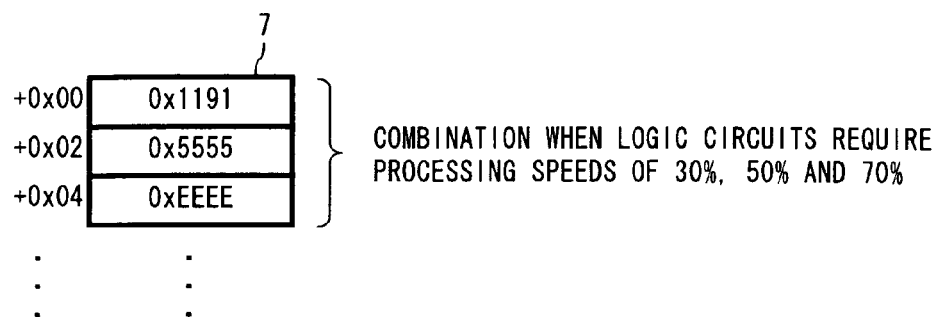
FIG. 9 is a diagram showing an example of an optimum combination of bitmap information in a shared memory in the clock generator according to the third embodiment.
Figure 10:
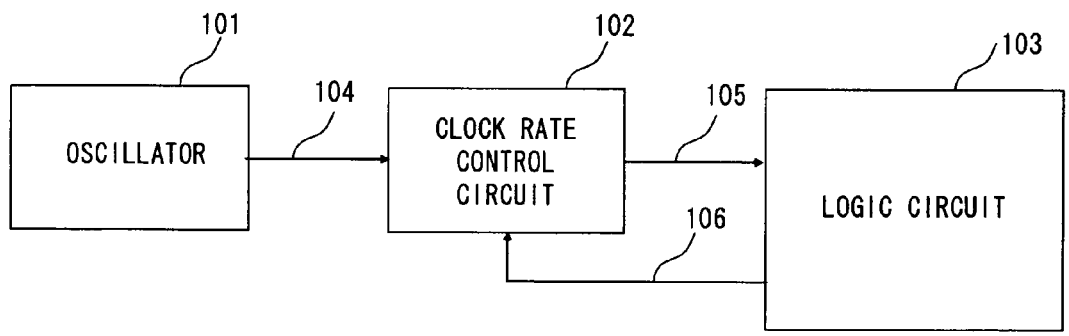
FIG. 10 is a block diagram to illustrate an overall configuration of a clock generator according to related art.
Figure 11:
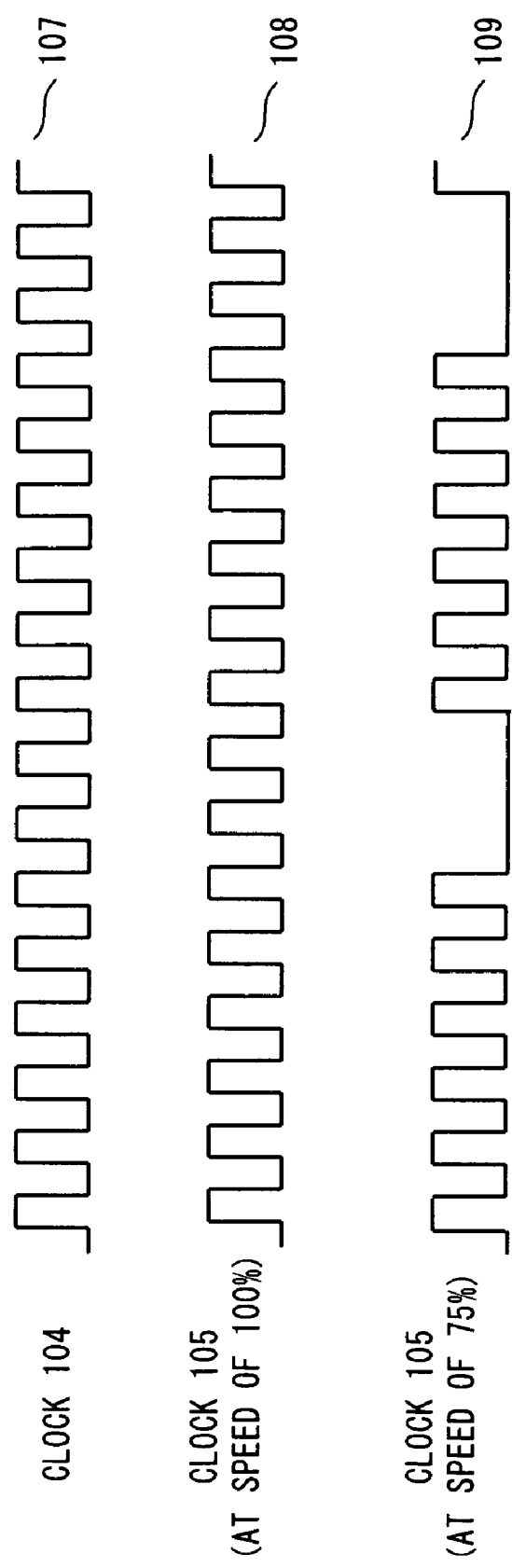
FIG. 11 is a timing chart to illustrate a clock waveform of the clock generator according to the related art.

A change over time of the total power of the logic circuits 3a, 3b and 3c driven with the intermittent clocks 12a, 12b and 12c generated in the clock generator according to the embodiment is described hereinafter with reference to FIG. 8. FIG. 8 is a timing chart showing an example of a change over time of the total power of the logic circuits as a whole driven using the clock generator according to the third embodiment. The case of generating the three intermittent clocks 12a, 12b and 12c in a period of 16 cycles, which correspond to 16 clock cycles of the reference clock 11 having a waveform 51 shown in FIG. 8, is described hereinafter by way of illustration.

First, the combination of the bitmap information 14 is defined in advance in the shared memory 7. For example, as shown in FIG. 9, 0x1191, 0x5555 and 0xEEEE (in hexadecimal notation) are respectively defined as the combination of the bitmap information 14 in the case of supplying the intermittent clocks 12 to the three logic circuits 3 which respectively require processing speeds of 30%, 50% and 70% and in which weighting of power is at a ratio of 1:2:3. When the logic circuits 3a, 3b and 3c respectively require processing speeds of 30%, 50% and 70%, and weighting of power is at a ratio of 1:2:3, the processor 6 reads 0x1191, 0x5555 and 0xEEEE as the bitmap information 14a, 14b and 14c, respectively, from the shared memory 7. Then, the processor 6 sets the bitmap information 14a, 14b and 14c, i.e., 0x1191, 0x5555 and 0xEEEE, to the bitmap circuits 4a, 4b and 4c, respectively.

The count value 15 generated by the counter 5 is incremented one by one from 0 to 15 in a repetitive manner based on the reference clock 11 as shown in a timing signal 52 in FIG. 8. As the clock enable 25a, the value of the bitmap information 14a at the bit position indicated by the count value 15 is selected by the selector 22 as shown in a waveform 64 in FIG. 8. The intermittent clock 12a oscillates only when the value of the clock enable 25a is 1.

Likewise, as the clock enable 25b, the value of the bitmap information 14b at the bit position indicated by the count value 15 is selected by the selector 22 as shown in a waveform 65 in FIG. 8. The intermittent clock 12b oscillates only when the value of the clock enable 25b is 1. As the clock enable 25c, the value of the bitmap information 14c at the bit position indicated by the count value 15 is selected by the selector 22 as shown in a waveform 66 in FIG. 8. The intermittent clock 12c oscillates only when the value of the clock enable 25c is 1.

In this manner, the intermittent clock 12a is processed into a waveform 67 shown in FIG. 8 by the intermittent clock generation circuit 2a. The waveform 67 is the intermittent clock 12a in which, in the period of 16 cycles, the reference clock 11 corresponding to 11 pulses is thinned out, and the reference clock 11 corresponding to 5 pulses is maintained. In the waveform 67 of FIG. 8, for example, the reference clock 11 is suspended when the count value 15 is 1, 2, 3, 5, 6, 9, 10, 11, 13, 14 and 15.

On the other hand, the intermittent clock 12b is processed into a waveform 68 shown in FIG. 8 by the intermittent clock generation circuit 2b. The waveform 68 is the intermittent clock 12b in which, in the period of 16 cycles, the reference clock 11 corresponding to 8 pulses is thinned out, and the reference clock 11 corresponding to 8 pulses is maintained. In the waveform 68 of FIG. 8, for example, the reference clock 11 is suspended when the count value 15 is 1, 3, 5, 7, 9, 11, 13 and 15.

Further, the intermittent clock 12c is processed into a waveform 69 shown in FIG. 8 by the intermittent clock generation circuit 2c. The waveform 69 is the intermittent clock 12c in which, in the period of 16 cycles, the reference clock 11 corresponding to 4 pulses is thinned out, and the reference clock 11 corresponding to 12 pulses is maintained. In the waveform 69 of FIG. 8, for example, the reference clock 11 is suspended when the count value 15 is 0, 4, 8 and 12.

When the intermittent clocks 12a, 12b and 12c as shown in the waveforms 67, 68 and 69 are respectively supplied to the logic circuits 3a, 3b and 3c, upon oscillation of the intermittent clocks 12a, 12b and 12c, a switching current of transistors flows inside the logic circuits 3a, 3b and 3c and a power is generated. As a result, a change over time of the total power consumed in the logic circuits 3a, 3b and 3c as a whole is as shown in a waveform 70 in FIG. 8.

When the value of the count value 15 is 1, the value of the clock enable 25a is 1, the value of the clock enable 25b is 1, and the value of the clock enable 25c is 0. At this time, the total power is $1 \times 1 + 1 \times 2 + 0 \times 3 = 3$.

Further, when the value of the count value 15 is 2, the value of the clock enable 25a is 0, the value of the clock enable 25b is 1, and the value of the clock enable 25c is 1. At this time, the total power is $0 \times 1 + 1 \times 2 + 1 \times 3 = 5$. A waveform 70 shows a change over time of the total power calculated in the same manner.

In the waveform 70, power fluctuations are small compared with a change over time of the total power in the case with no consideration of weighting of power shown in the waveform 63 of FIG. 7. It is thereby possible to suppress the peak power.

As described above, in this embodiment, the combination of the bitmap information 14 is set which minimizes a change over time of the total current value consumed in the plurality of logic circuits 3 in consideration of weighting of power. This enables more effective suppression of power fluctuations. It is thereby possible to suppress the peak power of the logic circuits 3 as a whole more effectively.

Other Embodiments

In the second and third embodiments, the case where the clock generator starts supply of the intermittent clocks 12 simultaneously to all of the plurality of logic circuits 3 is described; however, the timing to start supply of the intermittent clocks 12 is not limited thereto. The clock generator may start supply of the intermittent clocks 12 at different timing. This is described in further detail hereinbelow.

For example, in the clock generator that supplies the three intermittent clocks 12a, 12b and 12c to the three logic circuits 3a, 3b and 3c shown in FIG. 4, after supply of the intermittent clocks 12a and 12b to the logic circuits 3a and 3b is started, supply of the intermittent clock 12c to the logic circuit 3c may be started at different timing.

In this case, the processor 6 first reads the optimum combination of the bitmap information from the shared memory 7 according to the operating mode of the logic circuits 3a and 3b and sets them as the bitmap information 14a and 14b to the bitmap circuits 4a and 4b. Based on the set bitmap information 14a and 14b, the intermittent clock generation circuits 2a and 2b thin out given clock pulses from the reference clock 11 and thereby generate the intermittent clocks 12a and 12b. Then, the intermittent clock generation circuits 2a and 2b supply the generated intermittent clocks 12a and 12b to the logic circuits 3a and 3b.

Next, at the start of supply of the intermittent clock 12c, the processor 6 sets the bitmap information 14c based on the bitmap information 14a and 14b. Specifically, the processor 6 reads the bitmap information which corresponds to the operating mode of the logic circuit 3c and is optimally combined with the bitmap information 14a and 14b from the shared memory 7 and sets it as the bitmap information 14c to the bitmap circuit 4c. Based on the set bitmap information 14c, the intermittent clock generation circuit 2c thins out given clock pulses from the reference clock 11 and thereby generates the intermittent clock 12c, and then supplies the generated intermittent clock 12c to the logic circuit 3c.

As described above, by setting the bitmap information 14 of the intermittent clock 12 to be supplied based on the bitmap information 14 of the intermittent clock 12 already started to be supplied, it is possible to start supply of the intermittent clocks 12 to the plurality of logic circuits 3 at different timing.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A control system, comprising:
   a counter unit receiving a reference clock signal to generate a timing signal based on the reference clock signal;
   a plurality of intermittent clock generating units each coupled to a storage unit storing bit string data, each of the intermittent clock generating units receiving the reference clock signal and the timing signal, wherein each of the intermittent clock generating units masks a clock pulse of the reference clock signal based on the bit string data stored in the storage unit to output an intermittent clock signal in response to the timing signal;
   a plurality of logic circuits receiving the intermittent clock signals generated by the intermittent clock generating units;
   a control unit configured to set each of the bit string data to reduce a peak electric current of the logic circuits; and
   a memory storing a combination of the bit string data,
   wherein the combination of the bit string data is predetermined for reducing a peak electric current of the logic circuits, and
   the control unit sets each of the bit string data based on the combination of the bit string data stored in the memory.

2. A clock generator, comprising:
   a counter unit that counts an edge of a reference clock signal and generates a timing signal in each of a predetermined number of clock cycles;
   a first storage unit that stores a first bit string comprising a number of bits equal to the predetermined number of clock cycles;
   a first clock generation unit that generates a first intermittent clock signal comprising an intermittent pulse train by thinning out a combination of pulses indicated by the first bit string from the reference clock signal, and outputs the generated first intermittent clock signal according to the timing signal;
   a second storage unit that stores a second bit string comprising a number of bits equal to the predetermined number of clock cycles;
   a second clock generation unit that generates a second intermittent clock signal comprising an intermittent pulse train by thinning out a combination of pulses indicated by the second bit string from the reference clock signal, and outputs the generated second intermittent clock signal according to the timing signal; and
   a control unit that sets the first bit string to the first storage unit and sets the second bit string to the second storage unit,
   wherein the control unit sets the second bit string based on the first bit string.

* * * * *